United States Patent
Albert

[15] 3,672,523

[45] June 27, 1972

[54] SNOWMOBILE TRAILER

[72] Inventor: Fred R. Albert, 6060 State Road, North Street, Mich. 48049

[22] Filed: April 27, 1970

[21] Appl. No.: 31,940

[52] U.S. Cl. ...................214/506, 187/8.52, 188/32, 296/35 A
[51] Int. Cl. ..........................................B60p 1/28
[58] Field of Search .................214/505, 506; 296/35 A; 188/32; 187/8.52; 180/5 R

[56] References Cited

UNITED STATES PATENTS

| | | | |
|---|---|---|---|
| 3,437,354 | 4/1969 | Hetteen | 180/5 R |
| 3,536,214 | 10/1970 | Sorg | 214/85 |
| 3,493,210 | 2/1970 | Brenner | 188/32 X |
| 3,233,761 | 2/1966 | McCartney et al. | 188/32 X |
| 2,623,759 | 12/1952 | Forbas | 188/32 X |
| 3,035,728 | 5/1962 | Hecker | 214/505 |

*Primary Examiner*—Albert J. Makay
*Attorney*—Harness, Dickey & Pierce

[57] ABSTRACT

In combination with an apparatus for transporting snowmobile vehicles having one or more ski-like members, means on the apparatus defining a snowmobile vehicle support surface, a retaining element for releasably securing a snowmobile vehicle upon the surface, means for supporting the element for movement between a retracted position extending generally coplanar with the surface and an elevated position projecting upwardly from the surface and adapted for engagement with the ski-like member of a snowmobile supported on the surface, and means for resiliently biasing the element toward the elevated position, whereby a snowmobile vehicle may be traversed forwardly along the surface and the element will be biased to the retracted position as the ski-like member travels thereover, and the element will be biased to the elevated position once the member has traveled thereacross and will engage the rearward end of the member to prevent rearward movement of the vehicle along the surface.

6 Claims, 5 Drawing Figures

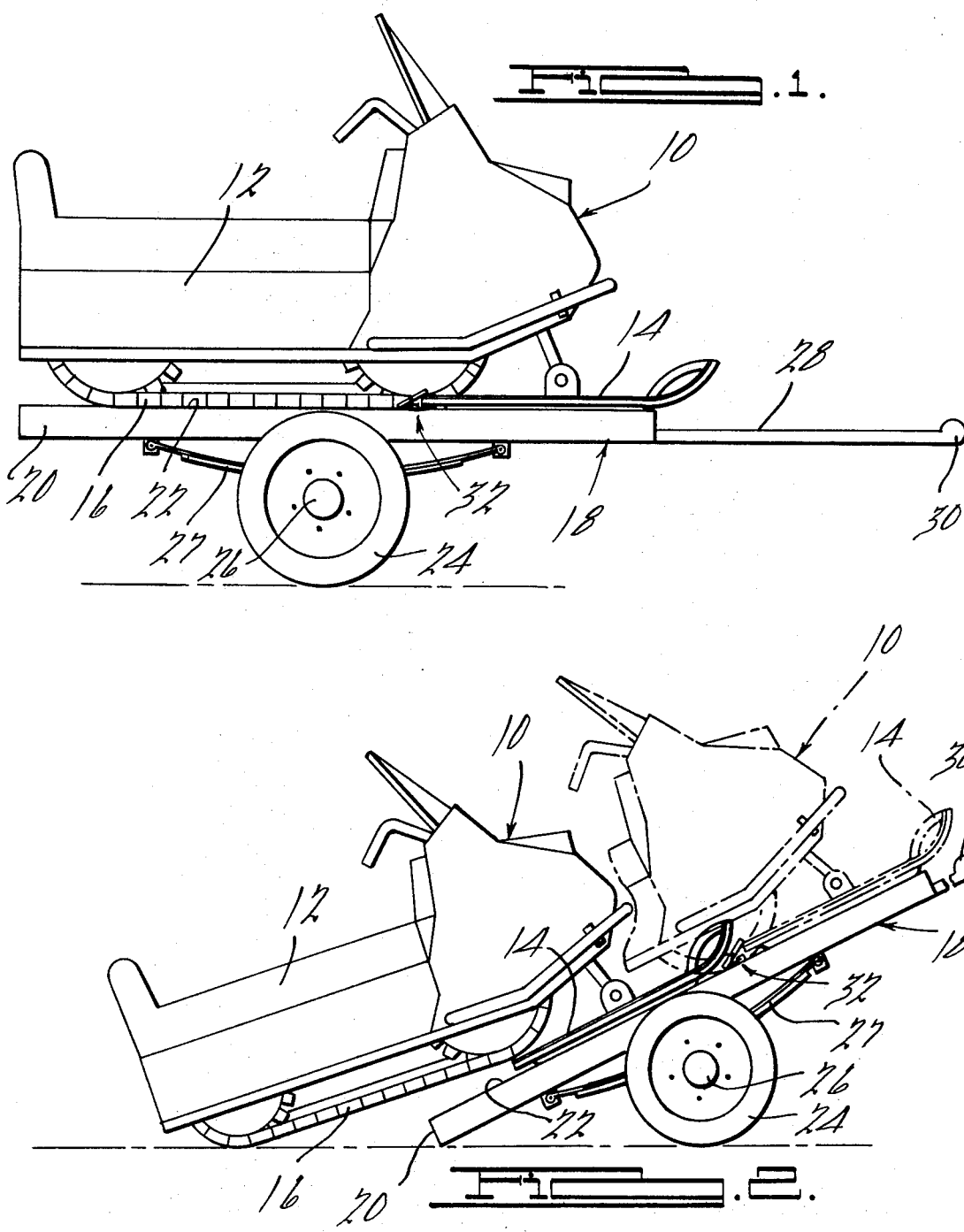

PATENTED JUN 27 1972 3,672,523
SHEET 2 OF 2
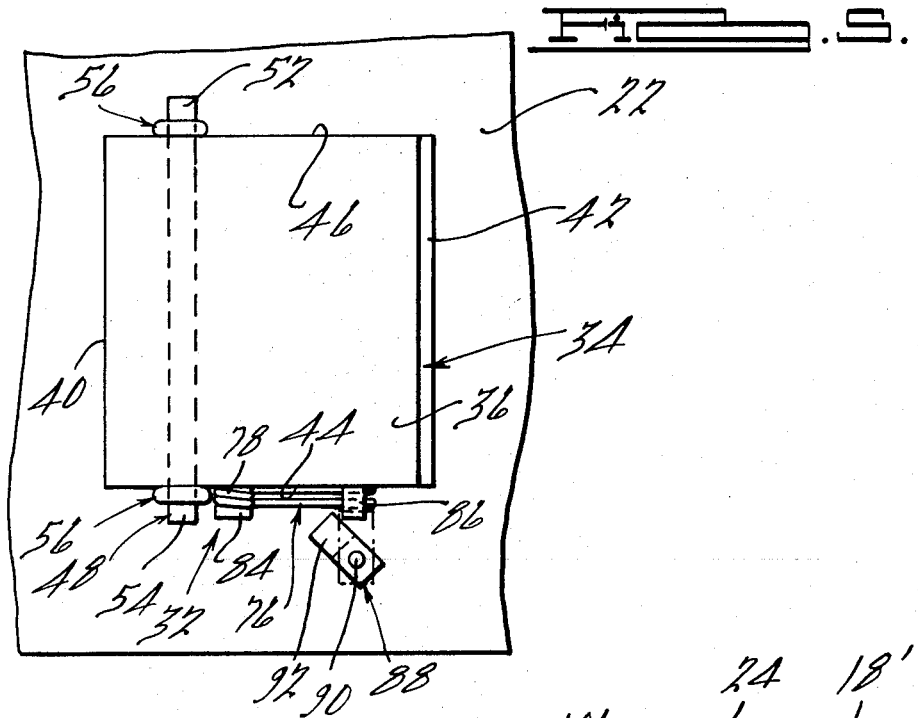
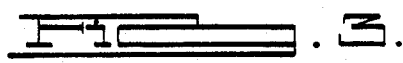
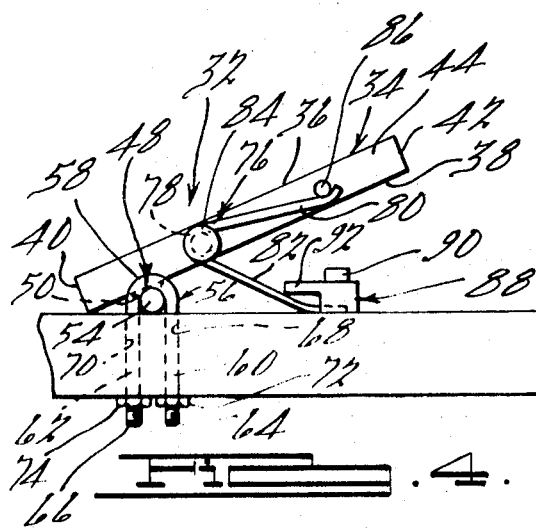
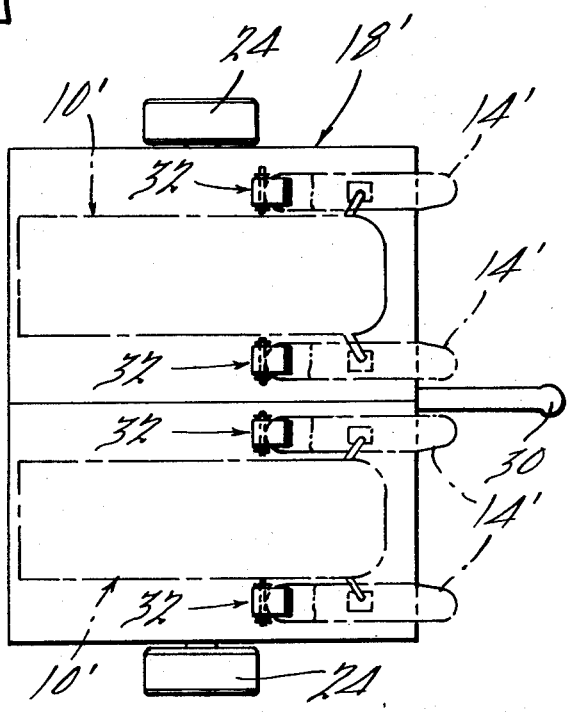
INVENTOR.
Fred R. Albert
BY
Harness, Dickey + Pierce
ATTORNEYS.

SNOWMOBILE TRAILER

BACKGROUND OF THE INVENTION

It has heretofore been the practice in transporting snowmobile and similar type vehicles having a pair of ski-like elements on the forward end thereof and a continuous ground engaging drive track, to carry the vehicles on generally flat bed trailers. In order to load such vehicles onto the trailer beds, it has been necessary to disconnect the trailer hitch from the associated towing vehicle and tilt the rearward end of the trailer downwardly to a position wherein it rests upon the ground. The snowmobile was then driven forwardly up the inclined trailer bed and one person was required to hold the brakes of the vehicle in an actuated condition to prevent the snowmobile from moving rearwardly down the inclined trailer bed, while a second person was required to force the forward end of the trailer downwardly to a position wherein the hitch thereof could be reattached to the towing vehicle. Thus, two individuals have been required to effect loading of snowmobiles on their respective transporting trailers, a practice which has been subject to considerable criticism due to the fact that in many instances, only one person is available for such loading operations.

The present invention provides a new and improved snowmobile trailer which is intended to overcome the aforementioned objectionable characteristics of similar type trailers heretofore known and used, through the provision of a novel retaining mechanism which is adapted to retain a snowmobile upon an inclined trailer bed without requiring that the snowmobile operator hold the brakes of the vehicle in an actuated condition. Accordingly, the present invention will permit a single person to drive a snowmobile up an inclined snowmobile trailer bed to a position wherein the novel retaining means of the present invention will automatically engage one or both of the ski-like elements on the forward end of the snowmobile and thereby retain the snowmobile in a preselected position upon the trailer bed. The operator may then, at his convenience, lower the forward end of the trailer to a position wherein the trailer hitch may be reattached to the towing vehicle without worrying that during the load bed lowering operation, the snowmobile might possibly move rearwardly off the trailer. Thus, through the provisions of the present invention, a single person may effect convenient and effortless loading of a snowmobile.

SUMMARY OF THE INVENTION

This invention relates generally to transporting trailers and the like and, more particularly, to a new and improved trailer for transporting snowmobile vehicles and the like.

It is accordingly a general object of the present invention to provide a new and improved snowmobile trailer.

It is a more particular object of the present invention to provide a new and improved snowmobile trailer which is provided with means for retaining a snowmobile in a preselected orientation upon the load bed thereof so that a single person may effect loading of a snowmobile upon its associated trailer.

It is another object of the present invention to provide a new and improved snowmobile trailer of the above character which is of an extremely simple design, is economical to manufacture, easy to assemble and which will have a long and durable operational life.

Other objects and advantages of the present invention will become apparent from the following detailed description taken in conjunction with the accompanying drawing.

BRIEF DESCRIPTION OF THE DRAWING

FIG. 1 is a side elevational view of a conventional snowmobile shown in operative association with the improved snowmobile trailer of the present invention;

FIG. 2 is a view similar to FIG. 1 showing various positions of the snowmobile as it is loaded onto the associated trailer;

FIG. 3 is a top elevational view of a pair of snowmobiles which are loaded on a trailer embodying the present invention;

FIG. 4 is an enlarged side elevational view of the snowmobile retaining assembly of the present invention; and FIG. 5 is a top elevational view of the assembly shown in FIG. 4.

DETAILED DESCRIPTION OF THE PREFERRED EMBODIMENT

For purposes of clarity of description, the terms "forwardly," "rearwardly" and derivatives thereof will have reference to the forward and rearward ends of the snowmobile trailer illustrated in the drawings, with the forward end thereof being located at the right sides of FIGS. 1 through 3 and the rearward ends thereof being located the left sides of these figures.

Referring now in detail to the drawings and in particular to FIGS. 1 through 3, a conventional snowmobile vehicle, generally designated by the numeral 10, is shown as comprising a passenger carrying body or chassis 12, a pair of ski-like steering and support elements 14 and an endless or continuous ground engaging drive track 16. The snowmobile vehicle, or a snowmobile 10 is shown in operative association with a transporting trailer constructed in accordance with the principles of the present invention and generally designated by the numeral 18. The trailer 18 is shown as comprising a generally flat load supporting structure or bed 20 which defines a generally flat support surface 22 along the upper side thereof and which is supported by means of a pair of conventional wheels 24 which are operatively connected to each other and to the load bed 20 by means of a conventional axle assembly 26 having a spring suspension 27. The forward end of the trailer 18 is provided with suitable trailer hitch or connecting mechanism, generally designated 28 which may be provided with any suitable attachment means 30 adapted for releasable connection to the trailer hitch of an associated towing vehicle (not shown).

As is well known in the art, at such time as it is desired to load or unload the snowmobile 10 from the load bed 20, the attachment means 30 is disconnected from the associated towing vehicle and the forward end of the trailer 18 is tilted upwardly from the position shown in FIG. 1 to the position shown in FIG. 2, wherein the rearward end of the load bed 20 is juxtapositioned against the ground or equivalent surface upon which the snowmobile 10 normally traverses. During loading, the snowmobile 10 is then driven upwardly along the inclined load bed 20 until it reaches a preselected position, such as that shown in phantom lines in FIG. 2. The forward end of the trailer is then tilted downwardly to the position shown in FIG. 1 and the trailer hitch 28 is then reattached to the towing vehicle preparatory to transporting the snowmobile 10. As will hereinafter be described in detail, the trailer 18 is provided with a new and improved means for retaining the snowmobile 10 upon the inclined load bed 20 during such time as the bed 20 is being moved or tilted from the position shown in FIG. 2 to that shown in FIG. 1, whereby a single person can effect loading of the snowmobile 10, instead of the normal two or more persons which have heretofore been required to perform such a loading operation.

Generally speaking, the aforementioned retaining means for releasably securing the snowmobile 10 upon the load bed 20 is in the form of a novel retaining assembly, generally designated by the numeral 32, which is adapted for engagement with the rearward end of one of the snowmobile ski elements 14 in a manner hereinafter to be described. The snowmobile trailer 18 is shown as being provided with one of retaining assembly 32 for engagement with one of the ski elements 14 of the snowmobile 10. It will be appreciated, of course, that a retaining assembly 32 may be provided for each of the snowmobile ski elements 14, and that a "double" trailer 18' shown in FIG. 3 may be provided with four of the assemblies 32, one for each of the two elements 14' on each of two snowmobiles 10'. Accordingly, the present invention is not intended to be limited to the use of any specific number of the assemblies 32 upon the trailer 18. It may be noted that the use of a single retaining assembly 32 for each snowmobile 10 will work particularly satisfactory wherein the associated snowmobile trailer is provided with a peripherally extending lip or shoulder portion against which the ski element opposite that which is engaged by the assembly 32 may abut and thus assure lateral orientation of the snowmobile upon the associated trailer. Whereas each of the assemblies 32 with which the snowmobile trailers 18 and 18' are provided is of the same general construction and operation, in order to simplify the instant disclosure, the construction and operation of only one of the assemblies 32 will be presented herein, it being appreciated that said description will apply equally to the other assemblies 32 shown in operation association with the trailers 18 and 18'.

Referring now in detail to FIGS. 4 and 5, the retaining assembly 32 illustrated therein is shown as comprising a generally flat, rectangular shaped plate-like element 34 which is defined by spaced parallel upper and lower surfaces 36 and 38, by rearward and forward edges 40 and 42, and by laterally spaced edges 44 and 46. The member 34 is adapted to be pivotably or hingedly connected to the upper surface of the load bed 20 by means of a pivot shaft or the like, generally designed by the numeral 48, which is adapted to be fixedly secured, as by welding or the like shown at 50, to the lower surface 38 of the element 34 at a position substantially adjacent the rearward edge 40 thereof. The shaft 48 is provided with laterally outwardly extending end portions 52 and 54 which are adapted to be pivotably connected to the load bed 20, which typically consists of heavy gage sheet metal or the like, by means of a pair of laterally spaced inverted U-bolt-like members, generally designated by the numeral 56. The members 56 comprise generally inverted U-shaped retaining sections 58 and downwardly extending spaced parallel leg portions 60 and 62 which are respectively formed with externally threaded end sections 64 and 66. As best shown in FIG. 4, the leg portions 60, 62 of each of the members 56 project downwardly through pairs of suitably aligned openings 68 and 70, respectively, formed in the load bed 20, thereby retaining the associated end portions 52, 54 of the shaft 48 between the retaining sections 58 and the adjacent portion of the surface 22. Suitable retaining nuts or the like 72, 74 may be then threadably received upon the threaded sections 64, 66, respectively, and properly tightened against the lower side of the load bed 20 to secure the U-bolt members 56 in place. It will be appreciated, of course, that the U-bolt members 56 should not be tightened to such a great degree upon the load bed 20 so as to inhibit rotation of the shaft 48 and hence prevent free pivotal movement of the element 34 of the assembly 32. It will also be appreciated that while the aforedescribed pivot shaft 48 and U-bolt securing members 56 have been found to be a highly satisfactory way of pivotably mounting the element 34, various alternative pivotal or hinge arrangements may be utilized in connection with the element 34 without departing from the scope of the present invention.

As best seen in FIG. 4, the retaining element 34 is adapted to pivotably move between a lower or retracted position wherein the element 34 is substantially coplanar with the load bed 20, and an upper or elevated position wherein the forward end of the element 34 is spaced or elevated above the surface 22. The assembly 32 is provided with means for resiliently urging the element 34 toward the aforesaid elevated position, which means is shown herein in the form of a hairpin-like spring member, generally designated by the numeral 76. The member 76 comprises a helical coil section 78 and a pair of spring arms 80 and 82, the coil section 78 being supported upon the lateral edge 44 of the element 34 by means of a suitable laterally outwardly projecting spring support pin 84, as illustrated. The spring member 76 is designed such that the arms 80, 82 thereof are spring biased apart, whereby the lower arm 82 will be biased into engagement with the surface 22 of the load bed 20, while the upper arm 80 will be biased into engagement with a laterally outwardly extending stud or the like 86 provided on the lateral edge 44 of the element 34 just forwardly of the pin 84. With this arrangement, the forward edge 42 of the element 34 will be biased upwardly to the position shown in FIG. 4 and the spring 76 will then resiliently maintain the member 34 in this position, yet will allow the member 34 to be biased to its respective retracted lower position under the influence of a suitable weight on the upper side or surface 36 thereof, as will hereinafter be described.

The retaining assembly 32 is provided with means for selectively maintaining the element 34 in its retracted or lower position. Such means is shown herein in the form of a pivotable or swingable retaining dog 88 which is pivotably mounted upon the upper surface 22 of the load bed 20 by means of a generally vertically disposed pivot pin, screw, bolt or the like, generally designated by the numeral 90. The dog 88 is provided with a locking flange portion 92 which is adapted to be pivoted in a manner shown in FIG. 5 toward and away from a position in generally vertical or overlying relationship with the stud 86. More particularly, the flange portion 92 of the dog 88 is adapted to be rotated from the solid line position shown in FIG. 5 to the phantom line position shown in this figure, wherein the flange 92 overlies the stud 86 once the element 34 has been biased to its lower position, thereby retaining the element 34 in said position. At such time as it is desired to permit the spring 76 to bias the element 34 to its elevated position, the dog 88 is merely pivoted from the phantom line position to the solid line position in FIG. 5. It may be noted that various alternative arrangements may be utilized in releasably maintaining the element 34 in its retracted position, such as suitable retaining brackets, hooks or the like, without departing from the fair meaning of the present invention.

As best illustrated in FIGS. 1 through 3, it will be seen that each retaining assembly 32 is mounted upon the upper surface 22 of the load bed 20 at a position in longitudinal alignment with one of the ski elements 14 of the snowmobile 10 and at a position adapted for engagement with the rearward ends of the elements 14 once the snowmobiles 10 have been properly positioned upon the load bed 20. In operation of the present invention, in order to effect loading of the trailer 18, the attachment means 30 is initially disconnected from the associated towing vehicle to permit the trailer load bed 20 to be tilted from the position shown in FIG. 1 to that shown in FIG. 2. Each snowmobile 10 is then driven upwardly over the inclined load bed 20 from the solid line position shown in FIG. 2 to the phantom line position shown in this figure. As the snowmobiles 10 are thus driven up the inclined surface 22, the leading edges of the ski elements 14 will engage the upper surface 36 of the elements 34, thereby biasing the elements 34 downwardly from their respective elevated positions to their respective lowered positions, whereby to permit the elements 14 to be driven over the upper sides of the assemblies 32. At such time as the snowmobiles 10 have been driven forwardly along the load bed 20 to a position where the rearward ends of the ski elements 14 have passed over the assemblies 32, the springs 76 will bias the elements 34 upwardly to their respective elevated positions. The snowmobiles 10 are then permitted to slide rearwardly and downwardly along the surface 22 to a position wherein the rearward ends of the elements 14 engage and are retained by the assemblies 32, which prevents further rearward movement of the snowmobiles 10 and hence retention thereof upon the trailer 18. The operator may then reposition the load bed 20 by tilting the forward end thereof downwardly so that the attachment means 30 may be resecured to the towing vehicle, preparatory to transporting the snowmobiles 10 and trailer 18 to some predetermined destination.

At such time it is desired to unload the snowmobiles 10, the attachment means 30 is disconnected from the towing vehicle so that the load bed 20 may be again tilted from its horizontal transport position to the tilted orientation shown in FIG. 2. The snowmobiles 10 are driven or otherwise moved forwardly upon the surface 22 to permit the elements 34 to be biased to their lower or retracted positions, at which time the dogs 88 may be biased to positions releasably maintaining the elements 34 in said lowered positions. The snowmobiles may then be driven or otherwise moved rearwardly down the inclined surface 22 to complete the unloading operation, after which time the dogs 88 may be biased away or unlatched from the studs 86 to permit the springs 76 to bias the elements 34 to their respective elevated positions preparatory to the next loading operation.

It may be noted that while the snowmobile trailer 10 of the present invention has been described and illustrated herein as being of the type which requires disconnection between the trailer hitch thereof and the associated vehicle in order to tilt the rearward end of the trailer bed downwardly to a vehicle loading position, the present invention is not intended to be limited specifically to such an arrangement, since the principles of the present invention apply equally well to snowmobile trailers that have a trailer bed which is tiltable relative to the hitch and trailer suspension between a normal horizontal position and a tilted loading position without requiring disconnection of the trailer hitch from the associated towing vehicle.

While it will be apparent that the preferred embodiment illustrated herein is well calculated to fulfill the objects above stated, it will be appreciated that the present invention is susceptible to modification, variation and change without departing from the scope of the invention.

I claim:

1. In combination, a snowmobile vehicle and a trailer having a support surface for said snowmobile which is tiltable from a transport position to a tilted loading position for transporting said snowmobile vehicle, said snowmobile having an endless drive track at one end thereof and at least one ski-like steering elements at the opposite end thereof, a load carrying bed defining said support surface, said support surface being of sufficient length so as to enable said snowmobile vehicle to be driven thereonto from one end thereof to a transport position wherein both the drive track and ski-like steering element are resting thereon, a retaining member mounted on said bed for releasably securing said snowmobile vehicle upon said support surface, said retaining member being located at a preselected longitudinal position along said bed so as to be engageable with the rearward end of the ski-like steering element of said snowmobile vehicle when the same is disposed in said transport position, hinge means for supporting said retaining member for pivotal movement between a retracted position extending generally coplanar with said support surface and an elevated position projecting upwardly from said support surface and adapted for engagement with the rearward end of said ski-like steering element of said snowmobile supported on said support surface, means for releasably maintaining said retaining member in said retracted position, spring means for resiliently biasing said retaining member toward said elevated position so that when said snowmobile vehicle is driven along said support surface toward said transport position, said retaining member will be biased to said retracted position as ski-like steering element travels thereover, and said retaining member will be biased to said elevated position once said ski-like steering element has traveled thereover and said snowmobile vehicle has reached said transport position on said bed, with said retaining member being engageable with said rearward end of said ski-like steering element to prevent movement of said snowmobile vehicle along said support surface away from said transport position when said support surface is in said tilted loading position.

2. The combination as set forth in claim 1 wherein said retaining member comprises a generally plate-like retaining member.

3. The combination as set forth in claim 1 which includes a pivot shaft fixedly secured to said retaining element adapted to pivotally support said member on said support bed.

4. The combination as set forth in claim 3 wherein said pivot shaft extends laterally outwardly from the opposite ends of said retaining member and which includes means for pivotably connecting the ends of said shaft to said bed.

5. The combination as set forth in claim 4 which includes a pair of inverted U-bolts for pivotably securing the ends of said shaft to said bed.

6. The combination as set forth in claim 1 wherein said spring means comprises a hairpin-like spring interposed between said support surface and said retaining member, and which includes means movable toward and away from engagement with said retaining member for releasably maintaining the same in said retraced position.

* * * * *